Figure 1:
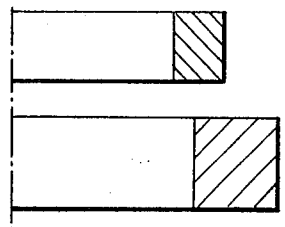
Figure 6:
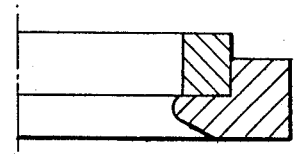

United States Patent [19]

Nordin

[11] 4,425,699

[45] Jan. 17, 1984

[54] METHOD OF CONNECTING TWO RINGFORMED ELEMENTS

[75] Inventor: Dag E. V. Nordin, Täby, Sweden

[73] Assignee: ITT Industries, Inc., New York, N.Y.

[21] Appl. No.: 225,839

[22] Filed: Jan. 19, 1981

Related U.S. Application Data

[63] Continuation of Ser. No. 951,933, Oct. 16, 1978, abandoned.

[30] Foreign Application Priority Data

Nov. 29, 1977 [SE] Sweden ............................ 7713479

[51] Int. Cl.³ .................... B21D 39/00; B23P 11/00
[52] U.S. Cl. .................................... 29/505; 29/447;
   29/525; 277/235 R
[58] Field of Search ................ 29/DIG. 34, 148.4 S,
   29/432, 505, 520, 149.5 R, 525, 283.5, 156.6,
   447; 277/235 R, 236, 233, 234, 227, 235 B, 96,
   96.1, 96.2, 190; 308/239; 285/DIG. 18, 330,
   322, 421

[56] References Cited

U.S. PATENT DOCUMENTS

| | | | |
|---|---|---|---|
| 697,546 | 4/1902 | Schier et al. | 277/235 |
| 761,325 | 5/1904 | Schier et al. | 277/235 |
| 1,099,716 | 6/1914 | Neuberth | 29/505 |
| 1,776,615 | 9/1930 | Boothman et al. | 29/525 X |
| 2,236,288 | 3/1941 | Engle et al. | 29/432 UX |
| 2,410,177 | 10/1946 | Marvin et al. | 277/236 X |
| 3,024,300 | 3/1962 | Martin | 29/525 X |
| 3,185,268 | 5/1965 | Heine | 29/525 X |
| 3,367,020 | 2/1968 | Watson | 29/432 X |
| 3,601,413 | 8/1971 | Darnell | 277/96.2 |
| 3,699,636 | 10/1972 | Walker | 29/432 |
| 3,762,881 | 10/1973 | Dunn | 308/239 X |
| 3,937,478 | 2/1976 | Mancebo | 277/236 X |

*Primary Examiner*—Charlie T. Moon
*Attorney, Agent, or Firm*—John T. O'Halloran; Peter R. Ruzek

[57] ABSTRACT

A method of connecting a mechanical seal ring made of hard metal or ceramic to a supporting ring made of aluminum or stainless steel includes pressing the two rings against each other with such a force that the material of the supporting ring yields.

2 Claims, 10 Drawing Figures

METHOD OF CONNECTING TWO RINGFORMED ELEMENTS

This is a continuation of application Ser. No. 951,933, filed Oct. 16, 1978 now abandoned.

This invention concerns a method of connecting two ringformed elements of different material and different plastic yield limits of pressure and more particularly for connecting a mechanical seal ring of ceramics or hard metal to a supporting ring of metal.

In mechanical seal arrangements where the demands on surface flatness, wear resistance, heat-conducting ability and reliability are very great, it is common to use hard metal or a ceramic material in one or both of the two seal rings rotating against each other. The seal ring is then so formed, that a minimum of material is used as such material is very expensive. This means that the seal ring must be mounted in a supporting ring of a material that is softer, easier to work and that conducts heat well.

Connection of such seal rings to supporting rings has up to now been carried out by soldering, gluing or shrinking. Other methods are rolling, clamping etc. An example of the first method is shown in the Swedish Pat. No. 347 344 and of the second method in the Swedish published application No. 398 152. It has, however, been established that all these methods have certain disadvantages. These disadvantages essentially result from the fact that it is difficult to manufacture such rings within tolerance limits. It has therefore been necessary to smoothen the rings by, for instance, diamond, which is very expensive. When using heating, there is also a risk that the ring will be deformed in different ways. When using gluing and clamping, the disadvantages have been partly eliminated. The use is, however, here limited by the low heat resistance of glue and elastomers, respectively. When using soldering, some of the disadvantages are eliminated but a relatively expensive post working is necessary. Normally soldered joints may not be used in seals which are used in corrosive media.

According to the invention a first ringformed element, a seal ring, is attached to a second element, a supporting ring, by pressing the two elements against each other with a power so strong that the material in the second element yields, the first element then being pressed into the second element thus obtaining a good connection.

Figure 2:
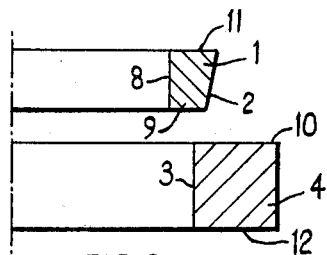
Figure 7:
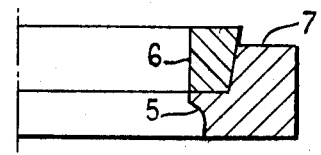
Figure 3:
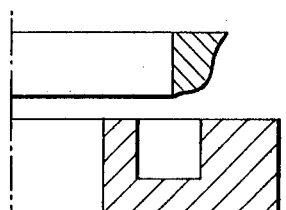
Figure 8:
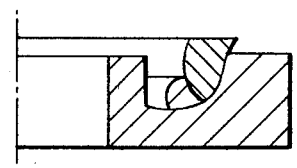
Figure 4:
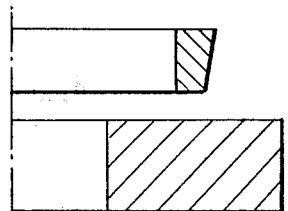
Figure 9:
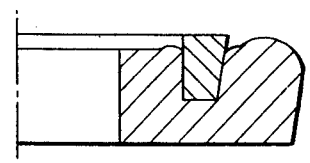

The invention is described more closely below with reference to the enclosed drawings, wherein FIGS. 1 to 5 show the two elements before being pressed together while FIGS. 6 to 10 show the results obtained for the various embodiments corresponding to those of FIGS. 1 to 5, respectively. FIGS. 2 and 7 will be especially referred to below.

Figure 5:
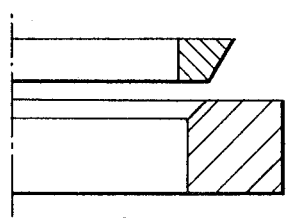
Figure 10:
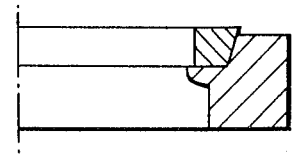

The seal ring 1 is made of hard metal or a ceramic material having a high pressure resistance. The outer peripheral surface 2 is cylindrical or has a decreasing diameter towards the contact surface (FIGS. 2-5). A special form is a conical surface. The contact surface 9 of the seal ring 1 has such dimension that it may be placed on the contact surface 10 of the supporting ring 4. As shown in FIG. 5, the surface 10 does not necessarily lie in a plane. The supporting ring 4 is made of a material which yields to pressures that are lower than a value corresponding to the value of the resistance to rupture of the material of the seal ring 1. Materials like aluminum and stainless steel can be used. By so arranging the seal ring 1 on the supporting ring 4 that the surfaces 9 and 10 are in coaxial contact and then pressing the surfaces 11 and 12 by, for instance, a press exerting such a force that the material in the surface 10 yields, the ring 1 will then sink into the supporting ring 4.

In case the outer peripheral surface 2 is not cylindrical the supporting ring 4 will be expanded like a conical press joint, the ring 1 then being maintained in position by the ring formed pressure in the supporting ring 4. The deformation of the contact surface of the supporting ring 4 may be so big that also yielding may take place. The occurring ring pressures are then limited to the yield tension limit by drawing.

A part of the attaching force may be locking because of uneven surfaces or friction welding which occurs by local heating without air access. It is important, however, that the ring 1 with its contact surface 9 determines the shape of the supporting ring 4 after the pressing so that the connection is obtained without the supporting ring having to be preworked to any special tolerance. It can be said that the ring 1 is used for working its own contact surface 7.

When the outer peripheral surface 2 is cylindrical the circumstances are different. Tests have shown that the ring 1 drops out of the supporting ring 4 if the pressing is not carried out at a high temperature. A condition is then that the linear expansion by heating is greater for the ring 1 than for the supporting ring 4. If the pressing is carried out at a high temperature the supporting ring 4 and the ring 1 will act as a normal contraction joint, the contraction pressure however being totally determined by the temperature difference and independent of any working tolerances in the contact surface 7 as the latter is formed by the ring 1.

In order to obtain a sufficiently even seal surface of the ring 1 (less than 1–10 μm) also at different working temperatures, it is necessary to work the surface 11 before the pressing and also that the surface of the press tool is of the same quality. If those demands are not fulfilled, the ring 1 will be deformed because of the high pressure forces. The ring 1 may be worked afterwards but this might bring about that the tensions in the contact surface 7 might change due to temperature differences and so cause a permanent unevenness.

Through the described method a mechanical seal has been obtained in which the amount of hard-workable material can be minimized and where working to accurate tolerances is avoided. The supporting ring 4 on the contrary may be given a suitable shape without considering the outer diameter tolerance of the ring 1 which may be several millimeters. In addition a very good distribution of the forces around the periphery of the ring 1 is obtained.

By mechanical seals friction heat is generated during operation. This heat is conducted away through the suppoting ring 4 due to the big contact surface between the ring 1 and the supporting ring 4 and this tends to increase the good seal reliability. The risks for solid bodies to be struck between the contact surfaces are further eliminated. Such bodies easily cause point deformations of the seal surface by contraction joints. Corrosion problems encountered in connection with soldering are also avoided. When the supporting ring 4 is made of, for instance, aluminum, it is possible to cover the surface facing the liquid with a layer of sheet metal for instance stainless steel, which is effectively fixed by the ring 1 during pressing, thus obtaining better corrosion conditions.

What is claimed is:

1. A method of connecting a mechanical seal ring of hard metal, ceramic or the like to a supporting ring of aluminum, stainless steel or some other relatively soft material, comprising the step of pressing the mechanical seal ring against the supporting ring with a power so strong that the material of the supporting ring is elastically and plastically deformed by the mechanical seal ring so that a good connection is obtained, wherein the mechanical seal ring before the pressing has a sealing surface smoother than 10 $\mu$m, preferably 1 $\mu$m, wherein a press tool is used for pressing said mechanical seal ring against the supporting ring, and wherein the surface of said press tool which presses against said mechanical seal ring is smoother than 10 $\mu$m, preferably 1 $\mu$m.

2. A method according to claim 1, wherein the surface of said press tool which presses against said mechanical seal ring is made of a similar material as said mechanical seal ring.

* * * * *